(12) United States Patent
Li et al.

(10) Patent No.: US 10,785,642 B2
(45) Date of Patent: Sep. 22, 2020

(54) WIRELESS PERSONAL AREA NETWORK UNDERLYING CELLULAR NETWORKS

(71) Applicant: Apple Inc., Santa Clara, CA (US)

(72) Inventors: Qian Li, Beaverton, OR (US); Geng Wu, Portland, OR (US); Lili Wei, Hillsboro, OR (US); Apostolos Papathanassiou, Campbell, CA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 15/755,530

(22) PCT Filed: Dec. 21, 2015

(86) PCT No.: PCT/US2015/067049
§ 371 (c)(1),
(2) Date: Feb. 26, 2018

(87) PCT Pub. No.: WO2017/039738
PCT Pub. Date: Mar. 9, 2017

(65) Prior Publication Data
US 2018/0255611 A1 Sep. 6, 2018

Related U.S. Application Data

(60) Provisional application No. 62/212,336, filed on Aug. 31, 2015.

(51) Int. Cl.
*H04L 12/801* (2013.01)
*H04L 12/24* (2006.01)
(Continued)

(52) U.S. Cl.
CPC ....... *H04W 12/00403* (2019.01); *H04W 4/70* (2018.02); *H04W 4/80* (2018.02);
(Continued)

(58) Field of Classification Search
CPC .......... H04W 92/18; H04W 12/00403; H04W 76/14; H04W 76/10; H04W 4/70; H04W 88/06
See application file for complete search history.

(56) References Cited

U.S. PATENT DOCUMENTS

2006/0025135 A1* 2/2006 Karaoguz ......... H04L 29/06027
455/436
2008/0062958 A1* 3/2008 Jonsson .................. H04L 41/00
370/350
(Continued)

FOREIGN PATENT DOCUMENTS

TW 201713143 A 4/2017
WO WO-2017039738 A1 3/2017

OTHER PUBLICATIONS

"International Application Serial No. PCT/US2015/067049, International Search Report dated May 27, 2016", 3 pgs.
(Continued)

*Primary Examiner* — Faruk Hamza
*Assistant Examiner* — Abusayeed M Haque
(74) *Attorney, Agent, or Firm* — Kowert, Hood, Munyon, Rankin & Goetzel, P.C.

(57) ABSTRACT

This document discusses, among other things, a wireless personal-area network (PAN) underlying a cellular wide-area network (WAN). The PAN includes a wearable user equipment (UE-W) and a user equipment aggregation node (UE-AN). The UE-W includes processing circuitry to process data for communication with a network of the WAN through the UE-AN, and radio interface circuitry to communicate with the UE-AN through a first air interface. The UE-AN includes processing to process data for communication between the network of the WAN and the UE-W, and radio interface circuitry to communicate with the network of the WAN through the first air interface and with the UE-W (Continued)

through a second air interface. The UE-W and the UE-AN can share a network credential, appearing as a single device to the WAN.

24 Claims, 4 Drawing Sheets

(51) Int. Cl.
| | | |
|---|---|---|
| H04L 5/14 | (2006.01) |
| H04W 12/00 | (2009.01) |
| H04W 4/70 | (2018.01) |
| H04W 76/10 | (2018.01) |
| H04W 4/80 | (2018.01) |
| H04W 88/04 | (2009.01) |
| H04W 88/06 | (2009.01) |
| H04W 12/04 | (2009.01) |
| H04W 76/14 | (2018.01) |
| H04W 92/18 | (2009.01) |
| H04W 84/18 | (2009.01) |

(52) U.S. Cl.
CPC ....... *H04W 12/0403* (2019.01); *H04W 76/10* (2018.02); *H04W 76/14* (2018.02); *H04W 88/04* (2013.01); *H04W 88/06* (2013.01); *H04W 92/18* (2013.01); *H04W 84/18* (2013.01)

(56) References Cited

U.S. PATENT DOCUMENTS

| | | | |
|---|---|---|---|
| 2009/0044258 A1 | 2/2009 | Zhong et al. | |
| 2009/0300219 A1* | 12/2009 | Yaussy | H04W 4/024 709/246 |
| 2010/0315225 A1 | 12/2010 | Teague | |
| 2013/0179944 A1* | 7/2013 | Kozlay | H04W 12/003 726/4 |
| 2014/0302848 A1 | 10/2014 | Ra et al. | |
| 2014/0344430 A1* | 11/2014 | Ayanam | H04L 41/0213 709/223 |
| 2014/0372551 A1* | 12/2014 | Fleck | H04W 4/50 709/213 |
| 2015/0277744 A1* | 10/2015 | Tang | G06F 40/166 715/863 |
| 2017/0200495 A1* | 7/2017 | Cho | G11C 13/004 |
| 2017/0272953 A1* | 9/2017 | Nathan | H04W 12/0608 |

OTHER PUBLICATIONS

"International Application Serial No. PCT/US2015/067049, Written Opinion dated May 27, 2016", 6 pgs.
"International Application Serial No. PCT US2015 067049, International Preliminary Report on Patentability dated Mar. 15, 2018", 8 pgs.

* cited by examiner

WIRELESS PERSONAL AREA NETWORK UNDERLYING CELLULAR NETWORKS

CLAIM OF PRIORITY

This application is a U.S. National Stage Application under 35 U.S.C. 371 from International Application No. PCT/US2015/067049, filed Dec. 21, 2015, which claims the benefit of priority of Jain et al., U.S. Provisional Patent Application Ser. No. 62/212,336, entitled "WIRELESS PERSONAL AREA NETWORK UNDERLYING CELLULAR NETWORKS," filed on Aug. 31, 2015, each of which are hereby incorporated by reference herein in their entirety.

TECHNICAL FIELD

This document relates generally to cellular communication and more particularly to wireless personal area networks underlying cellular networks. Some embodiments relate to wireless networks including 3rd Generation Partnership Project (3GPP) networks, 3GPP Long Term Evolution (LTE) networks, and 3GPP LTE Advanced (LTE-A) networks, although the scope of the embodiments is not limited in this respect. Some embodiments relate to Fifth Generation (5G) networks.

BACKGROUND

Machine-to-Machine (M2M) communication represents a significant growth opportunity for the 3rd Generation Partnership Project (3GPP) ecosystem. With proliferation of the wireless networks, there is an accelerated push towards connected, smart physical objects, such as wireless sensors, smart meters, dedicated microprocessors, etc., that span different ecosystems with diverse business models.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, a wireless personal area network (PAN) underlying cellular networks. The underlying cellular networks can include next generation mobile networks (NGMN) based on long term evolution (LTE) or 5G air interfaces or beyond.

The PAN can include, among other things, one or more Internet-of-Things (IoT) devices, such as one or more wearable user equipment (UE-W) devices, and a user equipment aggregation node (LE-AN) that, when combined, address one or more of the following usage scenarios: low latency; energy efficient; spectrum efficient; density; and low cost, to be disposable or deployable on a mass scale.

IOT devices can be generally classified into three categories: machine-type communication (MTC), such as machine-to-machine (M2M); vehicle-to-vehicle (V2V) or vehicle-to-infrastructure (V2I) (together, V2X); and wearable (W). MTC devices require range, latency, and energy efficiency. V2X devices require reliability and latency. Wearable devices require energy efficiency, latency, spectrum efficiency, and density.

For wearable devices, connectivity implementations having energy and spectrum efficiency, scalability, and flexibility in supporting device traffic types and requirements may enable communication among personal smart devices, including wearable devices and smart phones, and between smart devices and the wide-area wireless networks.

Legacy connectivity implementations for wearable devices are generally based on the IEEE 802.15 family of technologies, and are typically designed to target certain applications.

The PAN described herein can support a diverse array of wearable and handheld devices and features, including, for example, one or more of: universal, always-on connectivity; diverse traffic and applications, including wideband data streaming, bursty small packet, and low-latency mission critical traffic; dense PAN deployment; high energy efficiency; or high spectrum efficiency.

Figure 1:
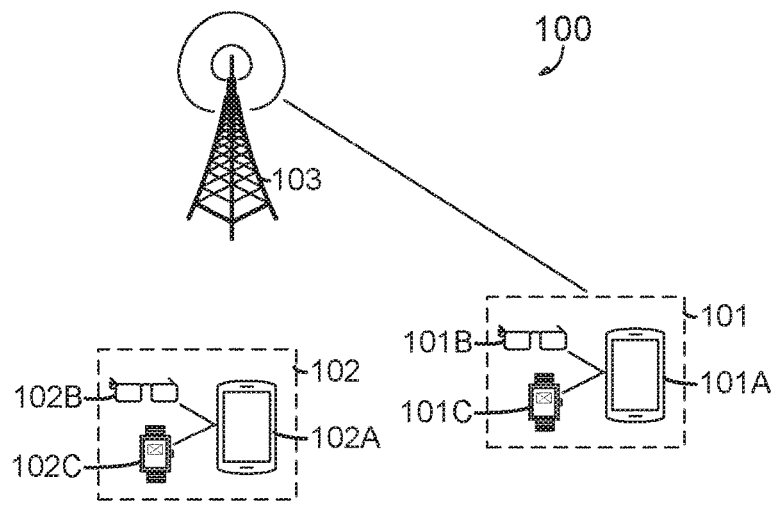
FIG. 1 illustrates generally an example Personal Area Network (PAN) in relation to a component of a cellular network.

FIG. 1 illustrates generally an example network architecture 100 including first and second personal area networks (PAN) 101, 102 in relation to a component of a wide area network (WAN) 103. In an example, the WAN 103 can include a cellular network, and the component of the WAN 103 can include a base station (BS), an enhanced Node B (eNB), a gateway (OW), etc.

A PAN can include an aggregate node (e.g., a user equipment aggregate node (UE-AN), such as a smart phone or other mobile computing device configured to communicate directly with a component of a cellular network) and one or more wearable devices (e.g., a wearable user equipment (UE-W), such as a smart watch, smart glasses, or one or more other mobile computing device configured to communicate with the UE-AN). In an example, the UE-AN can be configured to manage communication between the UE-W and the WAN. In other examples, the UE-W can receive communication from the WAN, but can only send information to the WAN through the UE-AN. In certain examples, the PAN appears to the WAN as a single device (e.g., the UE-AN and the UE-W in the PAN share a network credential, such as a single network ID, etc.).

In the example of FIG. 1, each of the first and second PANs 101 include a UE-AN 101A/101B and first and second wearable user equipment (UE-W) 101B/102B, 101C/102C. In an example, the component of the cellular network 101 can include a cellular base station (BS) or a component of a BS, such as an enhanced Node B (eNB), a Gateway (GW), etc.

The network architecture 100 includes two link categories: (1) a first link between the PAN and the WAN; and (2) a second link between devices within the PAN. In certain examples, the first and second links can appear decoupled. For example, the PAN (e.g., the first or second PAN 101, 102) may appear to the WAN 103 as a single device, e.g., having a single network ID in the WAN 103. The PAN may be an underlay network co-existent with the WAN 103, e.g., to maximize resource usage efficiency, such as spectrum or network efficiency, or to minimize power requirements for certain devices in the PAN (e.g., one or more UE-W devices).

The PAN may include various personal devices of diverse usages, traffic types, and communication/computation capabilities. For example, devices in the PAN (e.g., the first UE-W 101B) may have online traffic. The traffic size can vary, for example, between bursty small packets, high-speed data streaming, or file/data transfer. Further, traffic requirements may vary, and can include, among other things, stringent latency requirements, delay tolerant traffic, or reliability requirements.

In certain examples, devices in the PAN can have a cellular PHY protocol stack or compatible stack, and can be broken into two categories: (1) those with cellular network credentials, e.g., for the WAN 103; and (2) those without cellular network credentials. Devices in the PAN with cellular network credentials can operate in standalone mode. Devices in the PAN without cellular network credentials may only access the WAN 103 in an assisted mode, such as assisted by a device in the PAN with cellular network credentials (e.g., a full protocol stack, such as the UA-AN).

In an example, all devices in a PAN can share a cellular network credential. Communication within the PAN can occur in licensed or unlicensed spectrums. In certain examples, the unlicensed spectrum can be used as a secondary carrier. The operating bandwidth of the device in the PAN can depend on the UE category (e.g., MTC, V2X, W, etc.).

Devices within the PAN can communicate using a cellular-PAN link, such as a link between cellular base station (BS) and the PAN, or using an Intra-PAN link, such as a link between wearable devices (UE-W) in the PAN. For example, in FIG. 1, the first UE-W 101B can be coupled to the UE-AN 101A using an Intra-PAN link.

A UE-AN (e.g., the UE-AN 101A) can be defined to serve as a controller and aggregation point of the devices within the PAN. In certain examples, the cellular network may not be aware of one or more devices within the PAN, as the PAN network can appear as a single device to the cellular network, for example, by sharing the same network ID. The PAN can maintain a common and/or coordinated interface with the network.

In certain examples, devices in the PAN can receive/listen to the DL broadcasting and control/data signals addressed to the PAN ID by the WAN. A single UE-AN can be elected to manage most of the UL random access and control task for the PAN. For example, the UE-AN can send a random access request to the WAN (e.g., to a component of the WAN, such as a BS, an eNB, or a GW, etc.). The UE-AN can send UL control and feedback (e.g., Channel State information (CSI) and hybrid automatic repeat request (I-IARA)) feedback, buffer status report, etc.), and can manage handover. In certain examples, a full PAN handover may be performed when all devices in the PAN are under the same cell. In an example, each UE-W in the PAN can send sounding reference signals, and antenna ports may be defined in the UL for each UE-W.

In an example, devices in the PAN can perform coordinated or joint transmitting (Tx) or receiving (Rx), such as to improve spectrum efficiency, to share computation load, or to serve as relay for low end devices. In certain examples, the PAN can be viewed as a distributed multiple input multiple output (MIMO) or a coordinated multipoint (COMP) in UE side.

Decoupling the cellular-PAN link and the intra-PAN link can allow the development of a scalable, wearable PAN implementation, for example, to be used under various air-interface technologies, such as 4G-LTE, 5G new radio access technology (RAT), etc. In addition, decoupling may allow for backward compatibility with existing systems.

Resources for intra-PAN communication can be selected based on the interference level due to cellular communication links and other nearby PANs. In an example, the WAN can assign a region of resources for the PAN to select from. In certain examples, the network can explicitly signal the resource region, or implicitly signal the network load from which the PAN can select the resource region by choosing the region with low network load. The PAN can select the resource based on the network signaling and sensing of the surrounding interference (e.g., using the UE-AN). A UE-W in the PAN can be made aware of the selected resource by blind detection of the control information sent from the UE-AN (e.g., from the search space that may be indicated by the cellular network signaling).

In an example, the UE-AN can be responsible for controlling and coordinating the intra-PAN communication, including scheduling DL and UL resources or transmission power for the devices in the PAN. Medium access and radio resource management can be scheduling-based or contention-based. Bursty and low-latency traffic can be transmitted without scheduling, and massive data streaming can be scheduling-based.

Data transmission among the devices in the PAN can be based on the scheduling-based or contention-based radio resource management (RRM), and data exchange between the PAN and the WAN can be based on UE-AN relay or joint transmission/reception among the devices in the PAN. For general applications, a UE-AN relay can be applied. For applications that require a higher data rate, cooperative transmission/reception can be applied.

For lower data rates, the UE-AN relay communication between the devices in the PAN and the WAN, and the low-rate antenna port can be reused across multiple devices, such that traffic for various devices can share the same port at the UE-AN. For higher data rates, specified antenna ports can be defined, where some of the antenna ports can be implemented across wearable devices in the PAN. The UE-AN can activate the antenna port at the devices. From a cellular network point-of-view, the wearable devices can be indexed by the PAN ID and the port number, which can allow joint reception or transmission from the UE-W and UE-AN, forming a distributed antenna system at the UE side.

In an example, a device in the UE-AN category can include three operation modes: (1) a standalone mode, where the UE-AN can act as a normal cellular user device; (2) a relay mode, where the UE-AN can manage communication between the WAN and one or more other devices in the PAN; and (3) a cooperation-cluster header, where the UA-AN leverages one or more other devices in the PAN to communicate with the WAN.

In an example, a device in the UE-W category can include three operation modes: (1) a standalone mode, where the UE-W can require a cellular network credential to access the cellular network (e.g., the WAN); (2) a relay-assisted access mode, where all user data communication between the UE-W device and the cellular network goes through the UE-AN relay; or (3) a cooperative transmission/reception mode, where one or more of the devices in the PAN can form a distributed array in joint transmission/reception, serving as remote antenna for assisted data transmission/reception of one or more other device in the PAN.

As described herein, the network architecture 100 may support diverse applications and traffic types; achieve energy and spectrum efficiency; achieve low latency for mission critical applications; and may be capable to manage densely populated PANS. In certain examples, the network architecture 100 described herein may, among other things: achieve universal coverage and connectivity for wearable devices; self-adapt to different deployment environments (consumer, enterprise, operator) for best energy efficiency; enable network-assisted features such as security and privacy; efficiently operate in dense PAN scenario; achieve energy and spectrum efficiency; enable a personal network supporting multiple wearable devices; enable a horizontal implementation feasible for LTE and 5G air interfaces; or support diverse categories of devices and diverse types of traffic.

Embodiments of this disclosure may include designs for wireless personal area networks that underlay a network of cellular networks. In embodiments, a horizontal implementation may be applicable to various cellular network radio access technologies (RAT) including LTE and the future 5G new radio access technology (RAT). Devices, when used in embodiments of the network designs applied in LTE, may be referred to as LTE-Wearable (LTE-W) devices.

Figure 2:
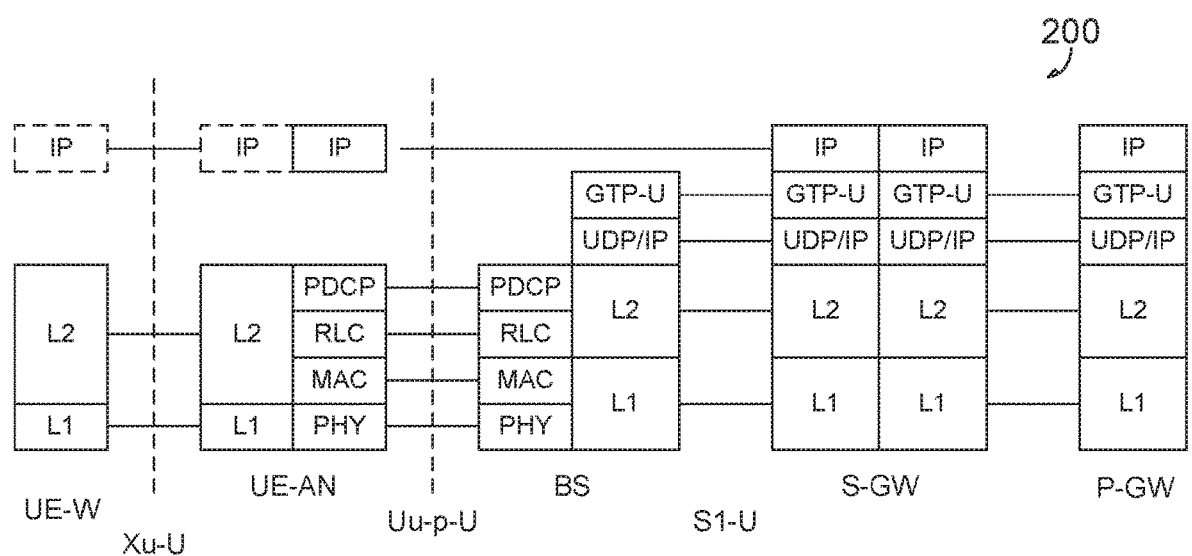
FIGS. 2-3 illustrate generally example Access Stratum protocol stacks in relay-assisted access mode and cooperative transmit/receive (Tx/Rx) mode.

FIG. 2 illustrates generally an example Access Stratum protocol stack 200 in relay-assisted access mode. In certain examples, the wearable devices (UE-W) in the Personal Area Network (PAN) can include the full protocol stack in the access stratum. Depending on the access mode, one or more portions of the protocol stack can be enabled. In certain examples, the packet data convergence protocol (PDCP) layer in the interface between UE-W and UE-AN can be replaced by an authentication and security protocol (ASP) layer, as specified by the PAN.

Figure 3:
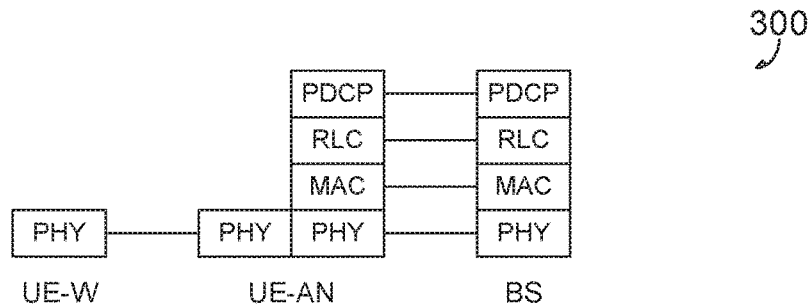

FIG. 3 illustrates generally an example Access Stratum protocol stack 300 in cooperative Tx/Rx mode, where two or more of the devices in the PAN (e.g., one or more UE-W and the UE-AN, two or more UE-Ws, etc.) operate in cooperative transmission/reception mode. In certain examples, only the PHY layer of the devices serving as remote antennas can be enabled.

The PAN may appear to the cellular network as a single device. The handover procedure may be implemented for the whole PAN, such that when a handover occurs from one cell to another, the whole PAN may be handed over.

Figure 4:
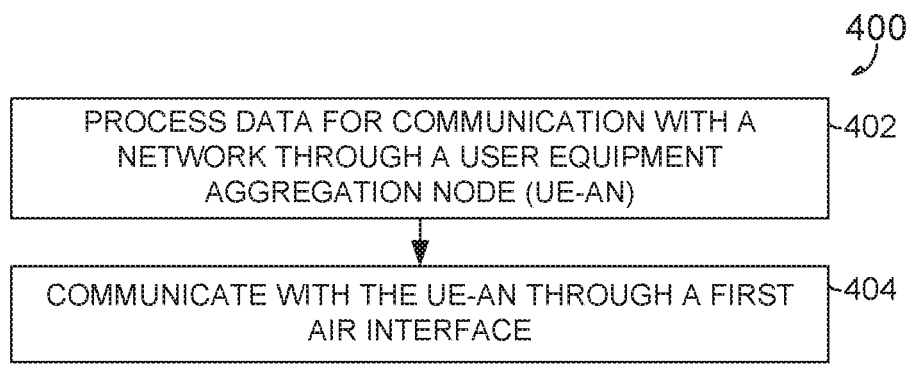
FIGS. 4-6 illustrate generally example process flow according to various embodiments described herein.

FIG. 4 illustrates generally an example process flow 400 for a personal area network (PAN) including a wearable user equipment (UE-W) and a user equipment aggregation node (UE-AN) underlying a cellular, wide area network (WAN). At 402, processing circuitry of the UE-W can process data for communication with a network of the WAN (e.g., separate from the PAN) through the UE-AN.

At 404, radio interface circuitry of the UE-W can communicate with the UE-AN through a first air interface. In certain examples, the UE-W and the UE-AN can share a single network credential for the WAN (e.g., a single network ID), such that the PAN can appear as a single device to the WAN.

In an example, the UE-W does not directly communicate with the WAN. In certain examples, the UE-W can be configured to receive network traffic from the WAN, but cannot send information directly to the WAN, instead using the UE-AN as a relay to communicate with the WAN. In an example, a first air interface between the UE-W and the UE-AN can include an unlicensed or low power spectrum, and a second air interface between the UE-AN and the WAN can include a licensed, cellular air interface. In other examples, the first air interface can include a licensed air interface.

In an example, the radio interface circuitry of the UE-W can assist communication between the UE-AN and the WAN, acting as a distributed antenna, coupled to an antenna port of the UE-AN, for example, to improve spectrum efficiency, to share computational load, or to serve as a relay for other UE-W devices in the PAN.

Figure 5:
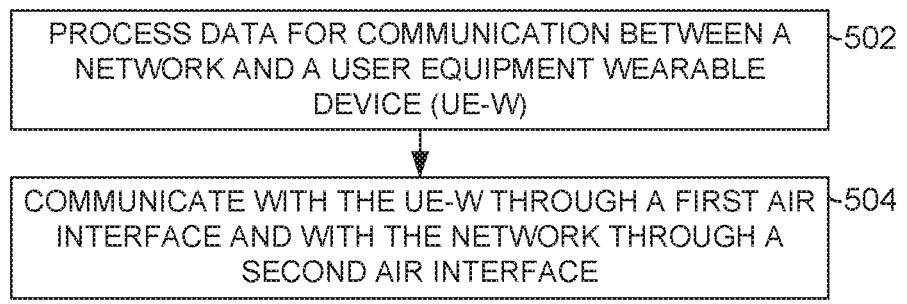

FIG. 5 illustrates generally an example process flow 500 for a personal area network (PAN) including a wearable user equipment (UE-W) and a user equipment aggregation node (UE-AN) underlying a cellular, wide area network (WAN). At 502, processing circuitry of the UE-AN can process data for communication between a network of the WAN (e.g., separate from the PAN) and the UE-W. In an example, the UE-AN can manage communication between the UE-W and the network of the WAN, including, for example, random access requests, upper layer (UL) control and feedback, handover, or scheduling.

At 504, radio interface circuitry of the UE-AN can communicate with the network of the WAN through a first air interface, and with the UE-W through a second air interface. In certain examples, the UE-W and the UE-AN can share a single network credential for the WAN (e.g., a single network ID), such that the PAN can appear as a single device to the WAN.

In an example, a first air interface between the UE-W and the UE-AN can include an unlicensed or low power spectrum, and a second air interface between the UE-AN and the WAN can include a licensed, cellular air interface. In other examples, the first air interface can include a licensed air interface.

In an example, the PAN can include a single UE-AN, and a plurality of UE-W devices coupled to the single UE-AN. In certain examples, the PAN can include more than one UE-AN that share a network credential.

Figure 6:
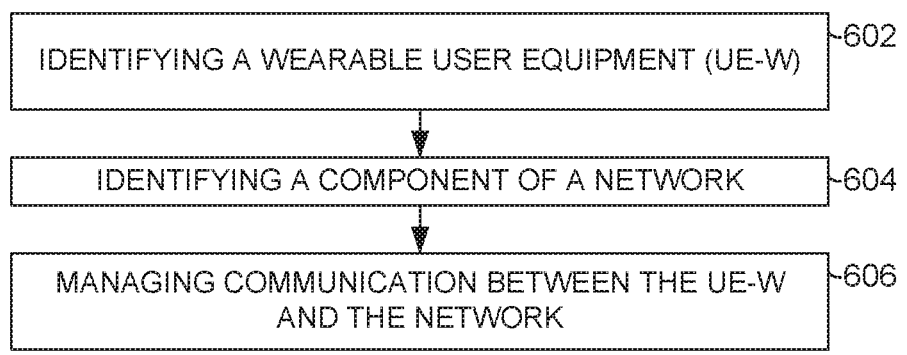

FIG. 6 illustrates generally an example process flow 600 for a personal area network (PAN) including a wearable user equipment (UE-W) and a user equipment aggregation node (UE-AN) underlying a cellular, wide area network (WAN). At 602, the UE-AN can identify one or more UE-Ws in the PAN. At 604, the UE-AN can identify a component of a network of the WAN, such as a base station (BS), an enhanced Node B (eNB), or a gateway (GW), etc. At 606, the UE-AN can manage communication, including controlling and signaling, between the one or more UE-Ws of the PAN and the WAN.

Figure 7:
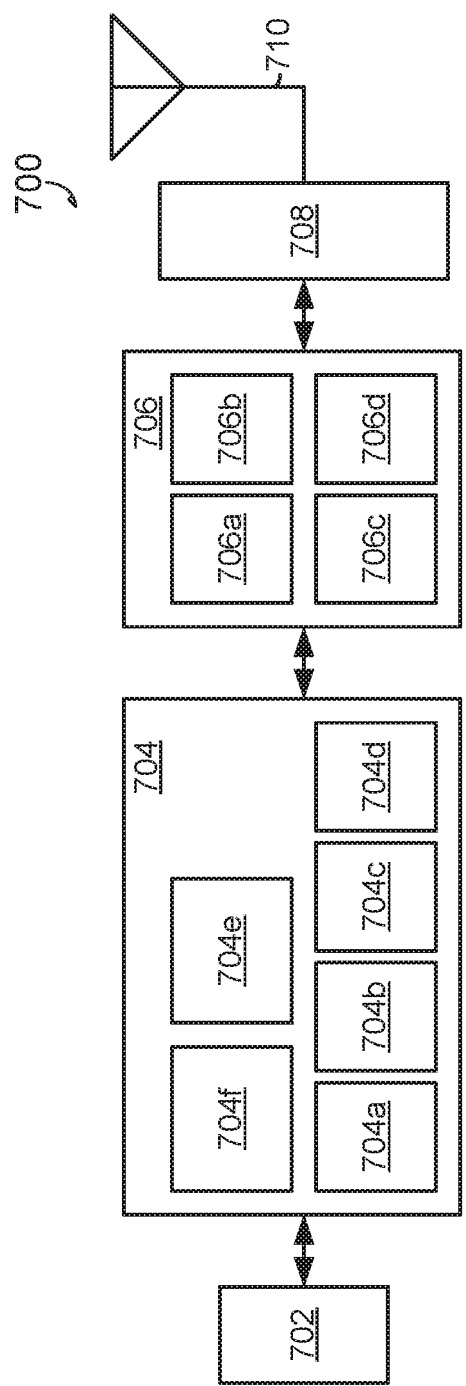
FIG. 7 illustrates generally a block diagram of an example UE upon which one or more embodiments may be implemented.

FIG. 7 illustrates generally a block diagram of an example UE 700 upon which one or more embodiments may be implemented. In an example, the UE 700 may include application circuitry 702, baseband circuitry 704, Radio Frequency (RF) circuitry 706, front-end module (FEM) circuitry 708 and one or more antennas 710, coupled together at least as shown. As used with reference to FIG. 7, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc. The processors may be coupled with and/or may include memory/storage and may be configured to execute instructions stored in the memory/storage to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, the baseband circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 6G, etc.). The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In an example, modulation/demodulation circuitry of the baseband circuitry 704 may include Fast-Fourier Transform (FFT), preceding, and/or constellation mapping/demapping functionality. In an example, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In an example, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC. RLC, PDCP and/or RRC layers. In an example, the baseband circuitry may include one or more audio digital signal processor(s) (DSP) 704f. The audio DSP(s) 704f may be include elements for compression/decompression and echo cancellation and may include other suitable processing elements in other embodiments. In an example, components of the baseband circuitry may be suitably combined in a single chip, a single chipset, or disposed on a same circuit board. In an example, some or all of the constituent components of the baseband circuitry 704 and the application circuitry 702 may be implemented together such as, for example, on a system on a chip (SOC).

In an example, the baseband circuitry 704 may provide for communication compatible with one or more radio technologies. For example, the baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In an example, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a, RE circuitry 706 may also include synthesizer circuitry 706d for synthesizing a frequency for use by the mixer circuitry 706a of the receive signal path and the transmit signal path. In an example, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In an example, the output baseband signals may be zero-frequency baseband signals, although this is not a requirement. In an example, mixer circuitry 706a of the receive signal path may comprise passive mixers, although the scope of the embodiments is not limited in this respect.

In an example, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In an example, the mixer circuitry 706a of the receive signal path and the mixer circuitry 706a of the transmit signal path may include two or more mixers and may be arranged for quadrature downconversion and/or upconversion respectively. In an example, the mixer circuitry 706a of the receive signal path and the mixer circuitry 706a of the transmit signal path may include two or more mixers and may be arranged for image rejection (e.g., Hartley image rejection) in an example, the mixer circuitry 706a of the receive signal path and the mixer circuitry 706a may be arranged for direct downconversion and/or direct upconversion, respectively. In an example, the mixer circuitry 706a of the receive signal path and the mixer circuitry 706a of the transmit signal path may be configured for super-heterodyne operation.

In an example, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In a dual-mode example, a separate radio IC circuitry may be provided for processing signals for each spectrum, although the scope of the embodiments is not limited in this respect.

In an example, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In an example, the synthesizer circuitry 706d may be a fractional N/N+1 synthesizer.

In an example, frequency input may be provided by a voltage controlled oscillator (VCO), although that is not a requirement. Divider control input may be provided by either the baseband circuitry 704 or the applications processor 702 depending on the desired output frequency. In an example, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In an example, the divider may be a dual modulus divider (DMD) and the phase accumulator may be a digital phase accumulator (DPA). In an example, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In an example, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In an example, the output frequency may be a LO frequency (fLO). In an example, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In an example, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RE signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

In an example, the UE 700 may include additional elements such as, for example, memory/storage, display, camera, sensor, and/or input/output (I/O) interface.

Figure 8:
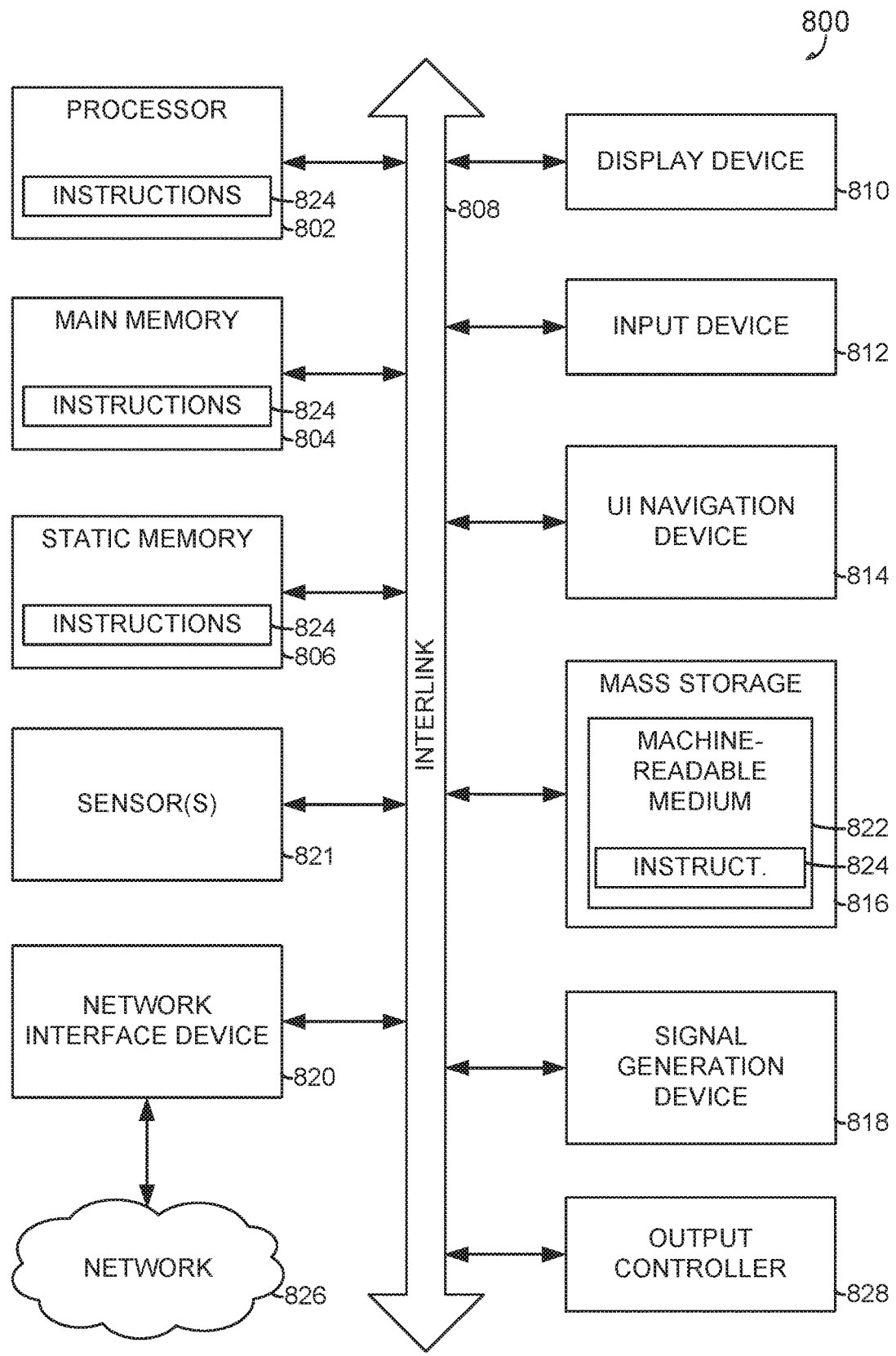
FIG. 8 illustrates generally a block diagram of an example machine upon which any one or more of the techniques discussed herein may perform.

FIG. 8 illustrates generally a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810 (e.g., a raster display, vector display, holographic display, etc.), an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internee protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Embodiments of the technology herein may be described as related to the Third Generation Partnership Project (3GPP) long term evolution (LTE) or LTE-advanced (LTE-A) standards. For example, terms or entities such as eNodeB (eNB), mobility management entity (MME), user equipment (UE), etc., may be used that may be viewed as LTE-related terms or entities. However, in other embodiments the technology may be used in or related to other wireless technologies such as the IEEE 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

ADDITIONAL NOTES AND EXAMPLES

In Example 1, personal devices with communication capability, including smart phones and wearable devices, may form a personal area network (PAN) with shared credential.

In Example 2, from the wide area network (WAN), such as the cellular network perspective, the PAN may appear to be a single device. A PAN ID can be defined for the network to address the PAN. All the devices in the PAN can be addressed using the PAN ID.

In Example 3, a user equipment aggregation node (UE-AN) can be elected for managing the control and signaling between the PAN and the cellular network and also within the PAN. Random access request can all send from the UE-AN. UL control and feedback (e.g., CSI and HARQ feedback, buffer status report) can all send from the UE-AN. Handover is managed by the UE-AN. In certain examples, only full PAN handover can be managed, as all devices in the PAN may be under the same cell.

In Example 4, wearable user equipment (UE-W) may send sounding reference signals. Multiple antenna ports can be defined in the UL each for one UE-W.

In Example 5, devices in the PAN can do coordinated/joint Tx/Rx, for example, to improve spectrum efficiency. High-end devices may share computation load or serve as a relay for low-end devices. Can be viewed as distributed MIMO or CoMP in UE side.

In Example 6, the resource used for intra-PAN communication can be selected based on the interference level due to cellular communication links and nearby PANs, for example, using the UE-AN. The network can assign a region of resources for the PAN to select from. The network can signal the resource region to the PAN. The PAN can select the resource based on the network signaling and its sensing on the surrounding interference. The UE-Ws in the PAN can be made aware of the selected resource by detecting of the control information send from the UE-AN within the network signaled resource region.

In Example 7, the UE-AN is responsible for controlling and coordinating the intra-PAN communication, including scheduling DL and UL resources for the devices in the PAN, or scheduling transmission power for the devices in the PAN.

In Example 8, medium access and radio resource management can be either scheduling based or contention based.

In Example 9, data transmission among the devices in the PAN can be based on the scheduling based or contention based radio resource management, RRM.

In Example 10, data exchange between the PAN and the wide area network WAN can be based on UE-AN relay or joint transmission/reception among the devices in the PAN. When operating in joint transmission/reception mode, the devices in the PAN can form a distributed antenna array. In an example, the devices can be identified by antenna ports.

In Example 11, the UE-Ws can have the full protocol stack in the access stratum. Depending on the access mode, part of the protocol stack can be enabled.

In Example 12, a UE-AN includes radio frequency (RF) and baseband circuitry. The RF circuitry can transmit signals to a base station (BS); transmit signals to one or more UE-Ws, the one or more UE-W and the UE-AN making up a personal area network, PAN; receive signals from the BS; and receive signals from one or more UE-Ws. The baseband circuitry can manage the control and signaling between the one or more UE-Ws and the BS.

In Example 13, the BS of any one or more of the examples herein is on a different network than the PAN.

In Example 14, the baseband circuitry of any one or more of the examples herein further includes identifying a random access request from one or more UE-Ws, wherein the radio frequency circuitry further includes transmitting the random access request to the BS.

In Example 15, the radio frequency circuitry of any one or more of the examples herein further includes transmitting upper layer (UL) control and feedback to the BS.

In Example 16, the UL control and feedback of any one or more of the examples herein includes channel state information, hybrid automatic repeat request feedback, and/or buffer status reports.

In Example 17, the UE-AN of any one or more of the examples herein may also be a UE-W.

In Example 18, a UE-W includes radio frequency (RF) circuitry and baseband circuitry. The RF circuitry can transmit signals to a UE-AN, the UE-AN operating in a personal area network, PAN; receive signals from the UE-AN; and receive signals from another UE-W device in the PAN. The baseband circuitry can identify information to be sent to a base station, BS to be routed through the UE-AN.

In Example 19, the UE-W of any one or more of the examples herein may also be the UE-AN.

In Example 20, the PAN and the BS of any one or more of the examples herein are different networks.

In Example 21, multiple antennas may be connected to the RF circuitry.

In Example 22, a method for implementing a PAN includes identifying, by the UE-AN, one or more UE-Ws that are connected by the PAN, identifying, by the UE-AN, a BS on a cellular network other than the PAN, for communication between the one or more UE-Ws and the BS, and managing, by the UE-AN, the controlling and signaling between the UE-Ws in the PAN and between the UE-Ws in the PAN and the cellular network.

In Example 23, the one or more UE-Ws of any one or more of the examples herein may be the UE-AN.

In Example 24, the PAN of any one or more of the examples herein is a Bluetooth™-based network.

In Example 25, an apparatus comprising means to perform one or more elements of a method described in or related to any of Examples 1-24, or any other method or process described herein.

In Example 26, one or more non-transitory computer-readable media comprising instructions to cause an electronic device, upon execution of the instructions by one or more processors of the electronic device, to perform one or more elements of a method described in or related to any of Examples 1-24, or any other method or process described herein.

In Example 27, a method, technique, or process as described in or related to any of Examples 1-24, or portions or parts thereof.

In Example 28, an apparatus comprising control logic, transmit logic, and/or receive logic to perform one or more elements of a method described in or related to any of Examples 1-24, or any other method or process described herein.

Example 29 is an apparatus of a wearable user equipment (UE-W), the apparatus comprising: processing circuitry to process data for communication with a network of a wide area network (WAN) through a user equipment aggregation node (UE-AN) of a personal area network (PAN) including the UE-W and the UE-AN; and radio interface circuitry to communicate with the UE-AN through a first air interface, wherein the UE-W and the UE-AN share a network credential.

In Example 30, the subject matter of Example 29 optionally includes, wherein the WAN includes a cellular base station (BS), wherein the network of the WAN includes a cellular network separate from the PAN, and wherein the network credential includes a single PAN identification (ID), and wherein all devices in the PAN share the single PAN ID.

In Example 31, the subject matter of any one or more of Examples 29-30 optionally include, wherein the UE-W and the UE-AN of the PAN are a single device to the WAN, and wherein the UE-AN is configured to manage communication between the UE-W and the network of the WAN.

In Example 32, the subject matter of Example 31 optionally includes, wherein the UE-AN is configured to communicate with the network of the WAN using the radio interface circuitry of the UE-W as a distributed antenna between the UE-AN and the WAN.

In Example 33, the subject matter of any one or more of Examples 29-52 optionally include, wherein the UE-W is configured to receive information from the network of the WAN and to transmit information to the network of the WAN through the UE-AN.

In Example 34, the subject matter of any one or more of Examples 29-33 optionally include, wherein the first air interface includes a low-power, unlicensed spectrum.

Example 35 is an apparatus of a user equipment aggregation node (UE-AN), the apparatus comprising: processing circuitry to process data for communication between a network of a wide area network (WAN) and a wearable user equipment (UE-W) of a personal area network (PAN) including the UE-AN and the UE-W; and radio interface circuitry to communicate with the network of the WAN through a first air interface and with the UE-W through a second air interface, wherein the UE-AN and the UE-W share a network credential.

In Example 36, the subject matter of Example 35 optionally includes, wherein the WAN includes a cellular base station (BS), wherein the network of the WAN includes a cellular network separate from the PAN, and wherein the network credential includes a single PAN identification (ID), and wherein all devices in the PAN share the single PAN ID.

In Example 37, the subject matter of any one or more of Examples 35-36 optionally include, wherein the UE-W and the UE-AN of the PAN are a single device to the WAN, and wherein the UE-AN is configured to manage communication between the UE-W and the network of the WAN.

In Example 38, the subject matter of Example 37 optionally includes, wherein the UE-AN is configured to manage at least one of: controlling and signaling between the PAN and the WAN; random access requests between the PAN and the WAN; uplink control and feedback between the PAN and the WAN; handover of the PAN with the WAN; or scheduling uplink or downlink resources for the PAN with the WAN.

In Example 39, the subject matter of any one or more of Examples 37-38 optionally include, wherein the UE-AN is configured to communicate with the network of the WAN using radio interface circuitry of the UE-W as a distributed antenna between the UE-AN and the WAN.

In Example 40, the subject matter of any one or more of Examples 35-39 optionally include, wherein the first air interface includes a low-power, unlicensed spectrum, and wherein the second air interface is a cellular air interface.

In Example 41, the subject matter of any one or more of Examples 35-40 optionally include, wherein the PAN includes a plurality of UE-Ws coupled to the UE-AN, and wherein the PAN is a single device to the WAN.

Example 42 is at least one machine readable medium including instructions that, when executed by a wearable user equipment (UE-W), cause the UE-W to: process data for communication with a network of a wide area network (WAN) through a user equipment aggregation node (UE-AN) of a personal area network (PAN) using processing circuitry of the UE-W; and communicate with the UE-AN through a first air interface using radio interface circuitry of the UE-W, wherein the PAN includes the UE-W and the UE-AN, and wherein the UE-W and the UE-AN share a network credential.

In Example 43, the subject matter of Example 42 optionally includes, wherein the WAN includes a cellular base station (BS), wherein the network of the WAN includes a cellular network separate from the PAN, and wherein the network credential includes a single PAN identification (ID), and wherein all devices in the PAN share the single PAN ID.

In Example 44, the subject matter of any one or more of Examples 42-43 optionally include, including instructions that, when executed by a UE-W, cause the UE-W to receive information from the network of the WAN and to transmit information to the network of the WAN through the UE-AN.

In Example 45, the subject matter of any one or more of Examples 42-44 optionally include, wherein the first air interface includes a low-power, unlicensed spectrum.

Example 46 is at least one machine readable medium including instructions that, when executed by a user equipment aggregation node (UE-AN), cause the UE-AN to: process data for communication between a network of a wide area network (WAN) and a wearable user equipment (UE-W) of a personal area network (PAN) using processing circuitry of the UE-AN; and communicate with the UE-AN through a first air interface using radio interface circuitry of the UE-W, wherein the PAN includes the UE-W and the UE-AN, and wherein the UE-W and the UE-AN share a network credential.

In Example 47, the subject matter of Example 46 optionally includes, wherein the WAN includes a cellular base station (BS), wherein the network of the WAN includes a cellular network separate from the PAN, and wherein the network credential includes a single PAN identification (ID), and wherein all devices in the PAN share the single PAN ID.

In Example 48, the subject matter of any one or more of Examples 46-47 optionally include, including instructions that, when executed by a UE-AN, cause the UE-AN to manage communication between the UE-W and the network of the WAN, wherein the UE-W and the UE-AN of the PAN are a single device to the WAN.

In Example 49, the subject matter of Example 48 optionally includes, including instructions that, when executed by a UE-AN, cause the UE-AN to manage at least one of: controlling and signaling between the PAN and the WAN; random access requests between the PAN and the WAN; uplink control and feedback between the PAN and the WAN; handover of the PAN with the WAN; or scheduling uplink or downlink resources for the PAN with the WAN.

In Example 50, the subject matter of any one or more of Examples 46-49 optionally include, including instructions that, when executed by a UE-AN, cause the UE-AN to communicate with the network of the WAN using radio interface circuitry of the UE-W as a distributed antenna between the UE-AN and the WAN.

In Example 51, the subject matter of any one or more of Examples 46-50 optionally include, wherein the first air interface includes a low-power, unlicensed spectrum, and wherein the second air interface is a cellular air interface.

In Example 52, the subject matter of any one or more of Examples 46-51 optionally include, wherein the PAN includes a plurality of UE-Ws coupled to the UE-AN, and wherein the PAN is a single device to the WAN.

In an example, the WAN includes a base station (BS), and the network of the WAN includes an operator network or a cloud service network. The PAN is a single device to the WAN, and includes a plurality of UE-W devices coupled to a single UE-AN. The network credential includes a single PAN identification (ID), and all devices in the PAN share the single PAN ID.

In an example, the UE-W is configured to receive information from the network of the WAN and transmits information to the network of the WAN through the UE-AN, and the UE-AN is configured to manage communication between the UE-W and the network.

In an example, the UE-AN is configured to manage random access requests, uplink control and feedback, handover, scheduling at least one of download resources, upload resources, or transmission power for the network. The first air interface includes a low-power, unlicensed spectrum, and the second air interface is a cellular air interface between the UE-AN and the BS.

In an example, the radio interface of the apparatus of the UE-W assists communication between the UE-AN and the WAN (e.g., to the BS or eNB) (e.g., to improve spectrum efficiency, to share computational load, to serve as a relay for other UE-W in the PAN). The radio interface of the apparatus of the UE-W is configured to send sounding reference signals to the WAN (e.g., to the BS or eNB). The PAN is configured to form a distributed antenna array, and the devices in the PAN are identified by antenna ports.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In an example, a system or apparatus can include, or can optionally be combined with any portion or combination of any portions of any one or more of the examples illustrated above to include, means for performing any one or more of the functions of the examples illustrated above, or a non-transitory machine-readable medium including instructions that, when performed by a machine, cause the machine to perform any one or more of the functions of the examples illustrated above.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein," Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus of a wearable user equipment (UE-W), the apparatus comprising:
processing circuitry to process data for communication with a network of a wide area network (WAN) through a user equipment aggregation node (UE-AN) of a person area network (PAN) including the UE-W and the UE-AN; and radio interface circuitry to communicate with the UE-AN through a first air interface, wherein the network of the WAN includes a cellular network separate from the PAN; wherein the UE-W and the UE-AN share a network credential and wherein the network credential includes a cellular network credential to access the cellular network.

2. The apparatus of claim 1, wherein the WAN includes a cellular base station (BS); and wherein the network credential includes a single PAN identification (ID), and wherein all devices in the PAN share the single PAN ID.

3. The apparatus of claim 1, wherein the UE-W and the UE-AN of the PAN are a single device to the WAN, and wherein the UE-AN is configured to manage communication between the UE-W and the network of the WAN.

4. The apparatus of claim 3, wherein the UE-AN is configured to communicate with the network of the WAN using the radio interface circuitry of the UE-W as a distributed antenna between the UE-AN and the WAN.

5. The apparatus of claim 1, wherein the UE-W is configured to receive information from the network of the WAN and to transmit information to the network of the WAN through the UE-AN.

6. The apparatus of claim 1, wherein the first air interface includes a low-power, unlicensed spectrum.

7. An apparatus of a user equipment aggregation node (UE-AN), the apparatus comprising:
processing circuitry to process data for communication between a network of a wide area network (WAN) and a wearable user equipment (UE-W) of a personal area network (PAN) including the EE-AN and the UE-W; and radio interface circuitry to communicate with the network of the WAN through a first air interface and with the UE-W through a second air interface, wherein the network of the WAN includes a cellular network separate from the PAN;

wherein the UE-AN and the UE-W share a network credential and wherein the network credential includes a cellular network credential to access the cellular network.

8. The apparatus of claim 7, wherein the WAN includes a cellular base station (BS); and wherein the network credential includes a single PAN identification (ID), and wherein all devices in the PAN share the single PAN ID.

9. The apparatus of claim 7, wherein the UE-W and the UE-AN of the PAN are a single device to the WAN, and wherein the UE-AN is configured to manage communication between the UE-W and the network of the WAN.

10. The apparatus of claim 9, wherein the UE-AN is configured to manage at least one of: controlling and signaling between the PAN and the WAN; random access requests between the PAN and the WAN; uplink control and feedback between the PAN and the WAN; handover of the PAN with the WAN; or scheduling uplink or downlink resources for the PAN with the WAN.

11. The apparatus of claim 9, wherein the UE-AN is configured to communicate with the network of the WAN using radio interface circuitry of the UE-W as a distributed antenna between the UE-AN and the WAN.

12. The apparatus of claim 7, wherein the first air interface includes a low-power, unlicensed spectrum, and wherein the second air interface is a cellular air interface.

13. The apparatus of claim 7, wherein the PAN includes a plurality of UE-Ws coupled to the UE-AN, and wherein the PAN is a single device to the WAN.

14. At least one non-transitory machine readable medium including instructions that, when executed by processing circuitry of a wearable user equipment (UE-W), cause the UE-W to:

process data for communication with a network of a wide area network (WAN) through a user equipment aggregation node (UE-AN) of a personal area network (PAN) using the processing circuitry of the UE-W; and communicate with the UE-AN through a first air interface using radio interface circuitry of the UE-W, wherein the PAN includes the UE-W and the UE-AN, wherein the network of the WAN includes a cellular network separate from the PAN; wherein the UE-W and the UE-AN share a network credential, and wherein the network credential includes a cellular network credential to access the cellular network.

15. The machine readable medium of claim 14, wherein the WAN includes a cellular base station (BS); and wherein the network credential includes a single PAN identification (ID), and wherein all devices in the PAN share the single PAN ID.

16. The machine readable medium of claim 14, including instructions that, when executed by the processing circuitry of the UE-W, cause the UE-W to receive information from the network of the WAN and to transmit information to the network of the WAN through the UE-AN.

17. The of machine readable claim 14, wherein the first air interface includes a low-power, unlicensed spectrum.

18. At least one non-transitory machine readable medium including instructions that, when executed by processing circuitry of a user equipment aggregation node (UE-AN), cause the UE-AN to: process data for communication between a network of a wide area network (WAN) and a wearable user equipment (UE-W) of a personal area network (PAN) using the processing circuitry of the UE-AN; and communicate with the UE-AN through a first air interface using radio interface circuitry of the UE-W, wherein the PAN includes the UE-W and the UE-AN, wherein the network of the WAN includes a cellular network separate from the PAN; wherein the UE-W and the UE-AN share a network credential, and wherein the network credential includes a cellular network credential to access the cellular network.

19. The machine readable medium of claim 18, wherein the WAN includes a cellular base station (BS); and wherein the network credential includes a single PAN identification (ID), and wherein all devices in the PAN share the single PAN ID.

20. The machine readable medium of claim 18, including instructions that, when executed by the processing circuitry of the UE-AN, cause the UE-AN to manage communication between the UE-W and the network of the WAN, wherein the UE-W and the UE-AN of the PAN are a single device to the WAN.

21. The machine readable medium of claim 20, including instructions that, when executed by the processing circuitry of the UE-AN, cause the UE-AN to manage at least one of: controlling and signaling between the PAN and the WAN; random access requests between the PAN and the WAN; uplink control and feedback between the PAN and the WAN; handover of the PAN with the WAN; or scheduling uplink or downlink resources for the PAN with the WAN.

22. The machine readable medium of claim 18, including instructions that, when executed by the processing circuitry of the UE-AN, cause the UE-AN to communicate with the network of the WAN using radio interface circuitry of the UE-W as a distributed antenna between the UE-AN and the WAN.

23. The machine readable medium of claim 18, wherein the first air interface includes a low-power, unlicensed spectrum, and wherein the second air interface is a cellular air interface.

24. The machine readable medium of claim 18, wherein the PAN includes a plurality of UE-Ws coupled to the UE-AN, and wherein the PAN is a single device to the WAN.

* * * * *